(12) United States Patent
Gilli

(10) Patent No.: US 6,702,580 B2
(45) Date of Patent: Mar. 9, 2004

(54) APPARATUS FOR DEMONSTRATING PAINTING AND/OR MURAL-COATING TECHNIQUES

(75) Inventor: Alberto Gilli, Andezeno (IT)

(73) Assignee: Candis S.r.l., Andezeno (IT)

( * ) Notice: Subject to any disclaimer, the term of this patent is extended or adjusted under 35 U.S.C. 154(b) by 0 days.

(21) Appl. No.: 10/157,132

(22) Filed: May 30, 2002

(65) Prior Publication Data

US 2003/0165798 A1 Sep. 4, 2003

(30) Foreign Application Priority Data

Mar. 1, 2002 (IT) .................................. TO2002A00176

(51) Int. Cl.⁷ .............................................. G09B 11/10
(52) U.S. Cl. ....................................................... 434/84
(58) Field of Search ........................... 434/84, 85, 219, 434/234, 162, 166

(56) References Cited

U.S. PATENT DOCUMENTS

| 2,212,576 | A |   | 8/1940 | Teodonno | |
| 3,724,016 | A | * | 4/1973 | Soffer | 15/98 |
| 4,231,668 | A | * | 11/1980 | Groth et al. | 401/146 |
| 4,539,932 | A | * | 9/1985 | Vecellio | 118/697 |
| 4,683,836 | A |   | 8/1987 | West | |
| 5,103,761 | A | * | 4/1992 | Ishibashi et al. | 118/323 |
| 5,107,719 | A | * | 4/1992 | Kota | 74/490.1 |
| 5,951,296 | A | * | 9/1999 | Klein | 434/84 |

* cited by examiner

Primary Examiner—Kurt Fernstrom
(74) Attorney, Agent, or Firm—Sughrue Mion, PLLC

(57) ABSTRACT

An apparatus for demonstrating painting and/or mural-coating techniques comprising a cabinet (1) from which there projects an implement for application (paintbrush, roller, spatula, glove, pad, or the like) (4), which can be displaced with respect to a branch (7a) of a mat (7) set in a position corresponding to a front opening (6) of the cabinet (1), according to oblique, horizontal, vertical or circular passes in alternatingly opposite directions during horizontal alternating strokes, and subsequent stepwise vertical displacements at the end of each horizontal stroke.

9 Claims, 4 Drawing Sheets

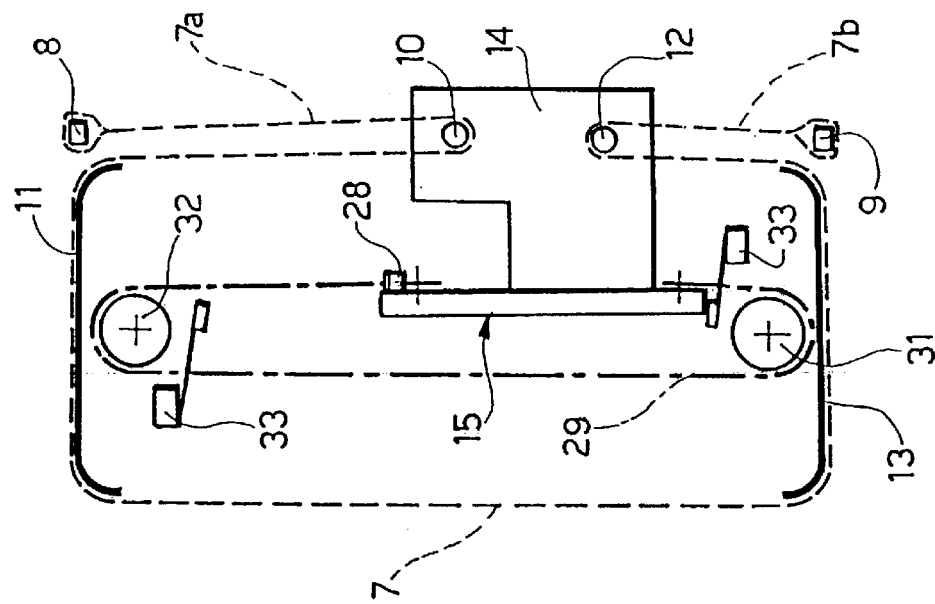
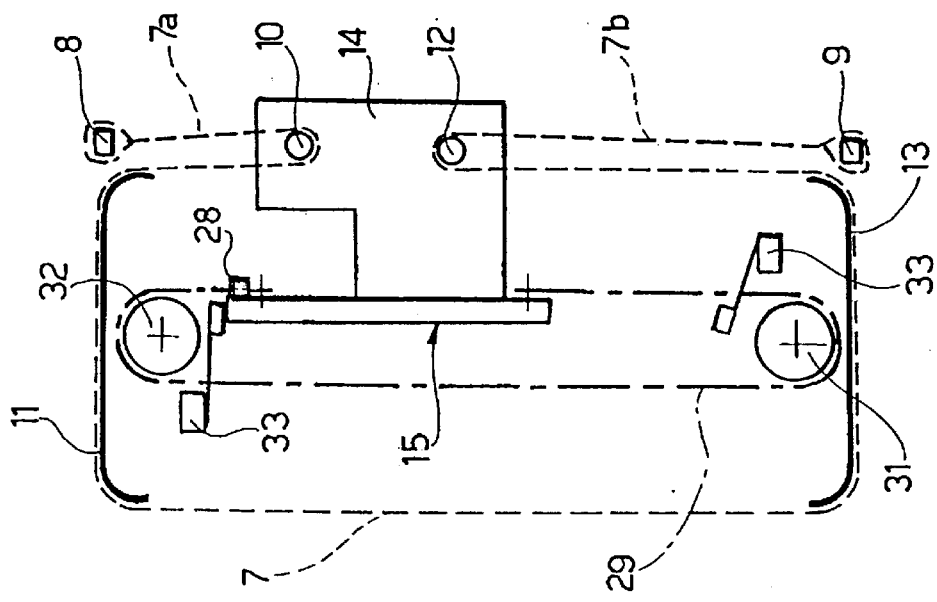

APPARATUS FOR DEMONSTRATING PAINTING AND/OR MURAL-COATING TECHNIQUES

FIELD OF THE INVENTION

The present invention relates in general to techniques of mural decoration, and the purpose thereof is, more in particular, to provide a particularly functional and effective piece of apparatus for demonstrating said techniques—for purposes of teaching or promotion—for the practical demonstration of particular painting and/or mural-coating techniques.

For an optimal yield, certain paints or coatings must be spread by adopting particular movements, for instance criss-cross ones, of an implement for their application, such as a paintbrush, roller, spatula, glove, pad, sponge, rag, or the like. The purpose of the present invention is precisely that of exemplifying and rendering evident said particular techniques of application.

SUMMARY OF THE INVENTION

The apparatus according to the invention is characterized in that it comprises:

a supporting cabinet having a front opening partially closed by a top branch and a bottom branch of the mat, which extends inside said cabinet;

a support, which projects from said front opening of the cabinet between said top branch and said bottom branch of the mat and bears an implement for application; and a motor-driven assembly for displacing said support so as to move said implement for application with respect to said top branch or bottom branch of the mat, according to passes in alternatingly opposite directions during horizontal alternating strokes and subsequent step-like vertical displacements at the end of each horizontal stroke, simultaneously with said mat.

The passes in alternatingly opposite directions may be horizontal, vertical, oblique, circular or also according to various combinations of said directions.

BRIEF DESCRIPTION OF THE DRAWINGS

The present invention will now be described in detail, with reference to the attached drawings, which are provided purely by way of non-limiting example and in which:

FIGS. 4 and 5 are two schematic and simplified views, which exemplify the vertical movement performed by the apparatus according to the invention.

DETAILED DESCRIPTION OF THE INVENTION

Figure 1:
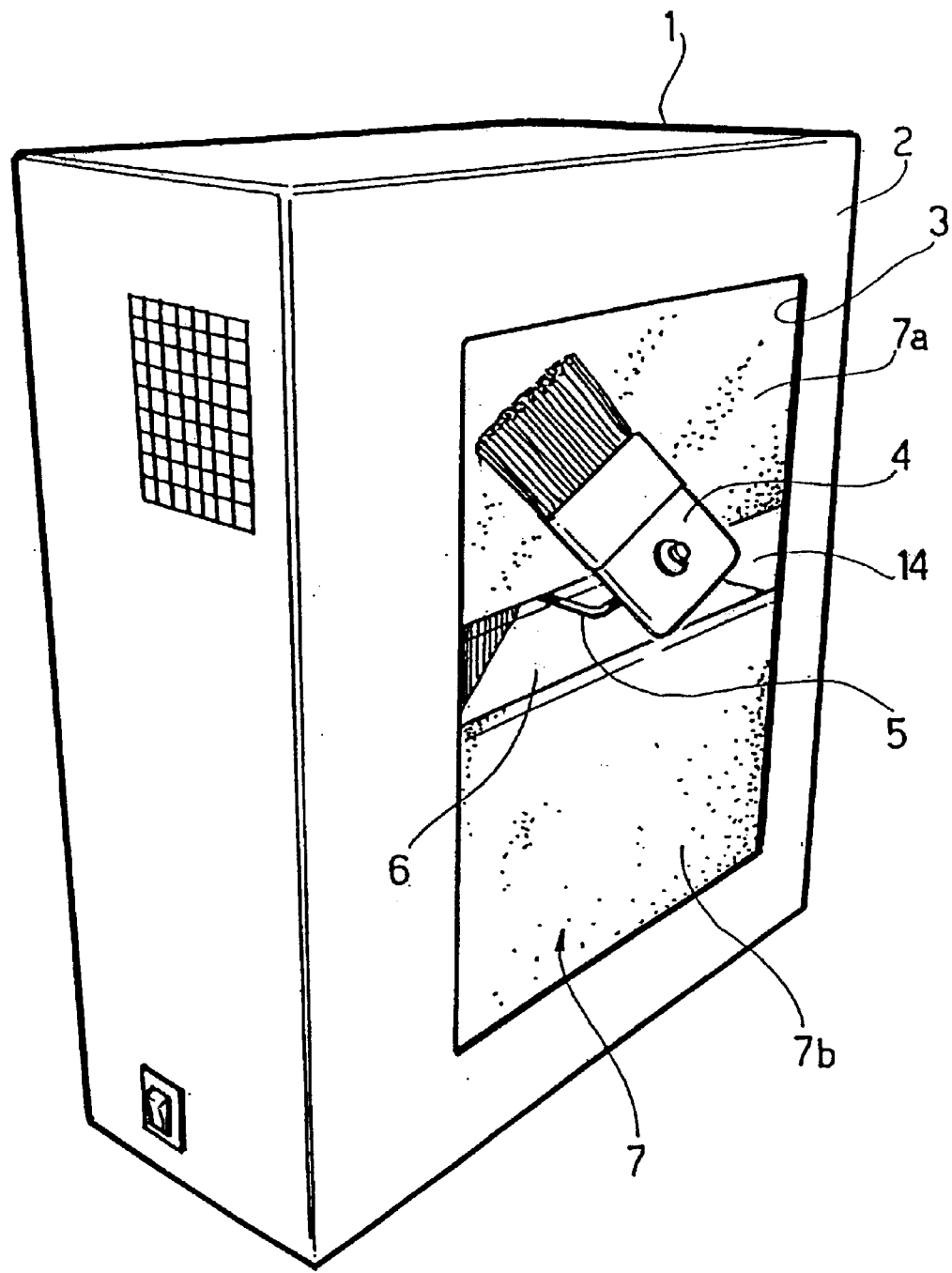
FIG. 1 is a perspective schematic view of an apparatus for demonstrations according to the present invention.

With initial reference to FIG. 1, the apparatus according to the invention, devised for demonstrating a particular technique of mural decoration, basically comprises a cabinet 1 having a generally parallelepipedal shape (or of any different design), the front wall 2 of which has an opening 3 from which there projects an implement that can be used for the said painting technique. In the case of the example illustrated, the implement consists of a paintbrush 4; alternatively it could consist of a roller, spatula, glove, pad, sponge, rag, or the like.

The paintbrush 4 is carried, in a position inclined with respect to the plane of the front wall 2, by a supporting arm 5, which projects from the opening 3 and extends within the cabinet 1 through a passage 6 defined between a top branch 7a and a bottom branch 7b of a mat 7. As is schematically illustrated in FIGS. 4 and 5, the mat 7 extends inside the cabinet 1, with the ends of the top branch 7a and of the bottom branch 7b anchored, respectively, in 8 and 9 to the cabinet itself.

The top branch 7a winds around a return rod or bar 10 and thus rests in a sliding way on a top support 11 of the cabinet 1. Likewise, the bottom branch 7b winds around a return rod or bar 12 and is thus slidable on a bottom support 13 of said cabinet 1.

The return rods 10 and 12 are carried horizontally by the side walls 14 of a vertical supporting member 15, which is vertically displaceable inside the cabinet 1 in the ways clarified in what follows.

The supporting arm 5 of the paintbrush 4 extends between the return rods 10 and 12 of the branches 7a, 7b of the mat 7 and is carried by a lever 16, supported in an oscillating way by a vertical plate 17 formed with a basically V-shaped guide groove 18, within which a locator pin 19 of the lever 16 engages. The plate 17 can slide horizontally, by means of a guide assembly 20, with respect to the supporting member 15 and functions as a support for a crank mechanism, designated as a whole by 21, the said crank mechanism being connected to the oscillating lever 16 through the pin 19. The plate 17 can be displaced horizontally along the guide assembly 20 and, hence, as has been said, with respect to the supporting member 15, by means of a first reversible electric motor 22, which is carried by the supporting member 15, the said electric motor controlling rotation of a gear wheel 23, on which a closed-loop chain 24 bearing a locator pin 25 connected to the plate 17 winds.

A pair of limit switches 26 operated by the plate 17 controls, as will be seen, vertical displacement of the latter in synchronization with its horizontal displacements.

Figure 2:
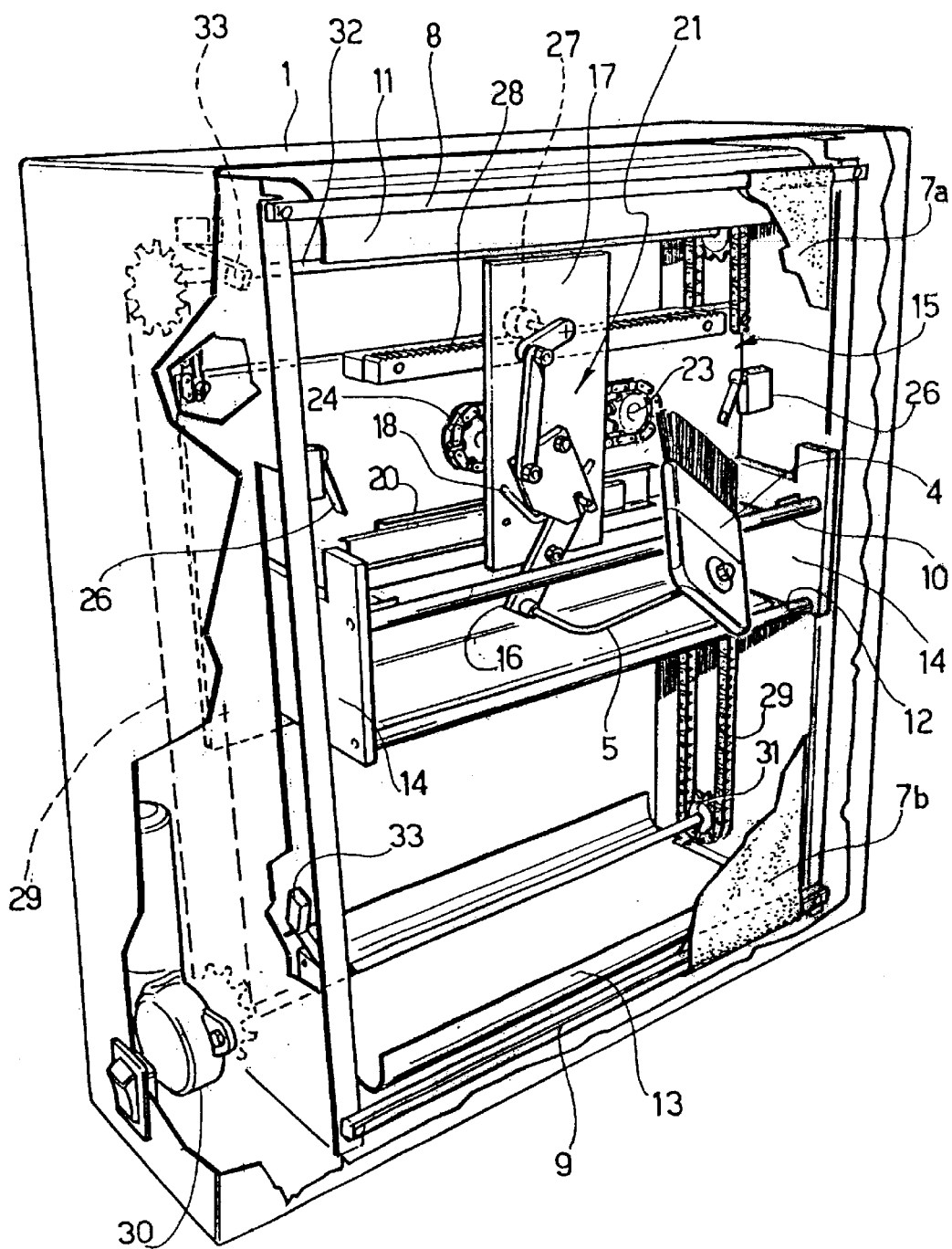
FIG. 2 is a partially interrupted view similar to that of FIG. 1, at an enlarged scale.
Figure 3:
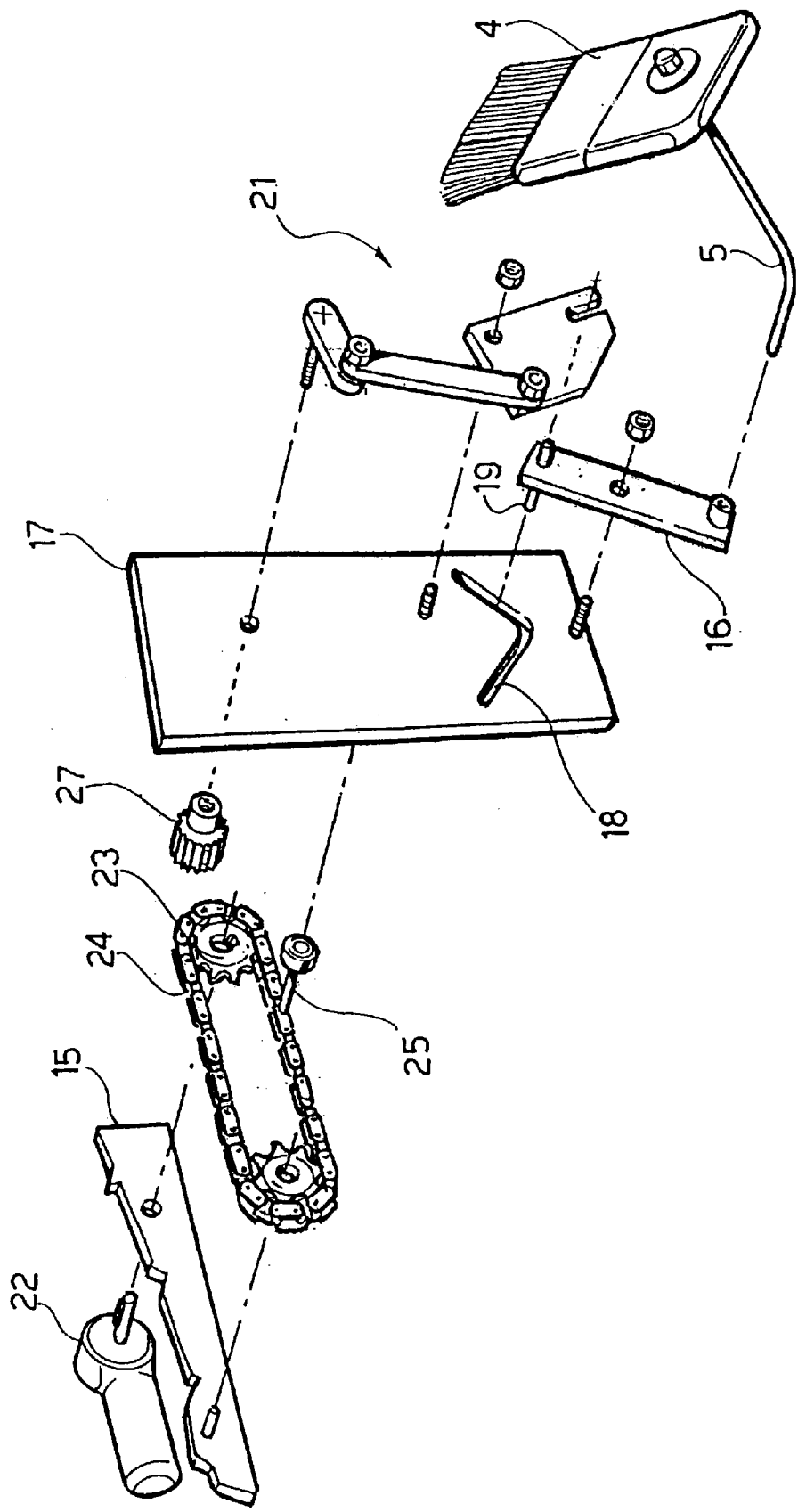
FIG. 3 is an exploded perspective view of a motor-driven assembly of the apparatus.

The plate 17 with the crank mechanism 21 and the support 5 of the paintbrush 4 are thus moved horizontally with alternating rectilinear motion with respect to the supporting member 15 by means of the electric motor 22 and the chain 24. As a result of the said displacements, the crank mechanism 21 is operated, via a sprocket 27, which is engaged on a horizontal rack 28 fixed to the supporting member 15, in such a way as to move the paintbrush 4 obliquely in alternatingly opposite directions. The positions alternatingly assumed by the paintbrush 4 in one direction and in the opposite direction are represented, respectively, in FIG. 1 and in FIGS. 2 and 3.

As mentioned previously, the supporting member 15 can be displaced vertically inside the cabinet 1 by means of a pair of closed-loop vertical side chains 29 operated by a second reversible electric motor 30 and respective return shafts, a bottom one 31 and a top one 32.

The electric motor 30 is activated in an intermittent way by the limit switches 26, which are actuated by the plate 17 at the end of each horizontal stroke in one direction and in the opposite direction of the plate, so as to control the latter's stepwise descent.

A pair of limit switches 33 operated by the supporting member 15 reverse the direction of rotation of the motor 30, one at the end of the downward stroke, and one at the end of the upward stroke of said supporting member 15. During said strokes, the return rods 10 and 12 lengthen (rod 10) and shorten (rod 12) the top branch 7a and the bottom branch 7b of the mat 7, in the way represented in FIGS. 4 and 5.

The actuators described above are connected to an electronic control computer which can be programmed according to the requirements.

In operation, the paintbrush 4, which can be seen from outside the cabinet 1 in the way described in FIG. 1, is moved along the branch 7a of the mat 7 according to oblique passes in alternatingly opposite directions, at the same time displacing horizontally. At the end of each horizontal stroke towards the right or towards the left, the horizontal motion is reversed, whilst activation of the electric motor which determines the vertical stepwise displacement of the supporting member 15, and hence of the paintbrush 4, as well as of the mat 7, is controlled by means of the switches 26. The stepwise descent of the supporting member 15 proceeds until the bottom limit switch 33 is reached, after which the motor 30 controls its return upwards until the top limit switch 33 is reached, and the cycle is thus repeated in an identical manner.

Of course, the details of construction and the embodiments may vary widely with respect to what is described and illustrated herein, without thereby departing from the scope of the present invention as defined in the ensuing claims. Thus, for instance, all the mechanical and electromechanical components for actuating the paintbrush 4 can be replaced by functionally similar or equivalent devices. By modifying the logic of the control computer, and/or the mechanical conformation of the control assemblies, it is possible to obtain a versatility suitable for any desired demonstration process: for example, instead of being moved obliquely, the implement 4 for application can be moved according to passes in alternatingly opposite directions, horizontally, vertically, or according to a circular pattern, or even in various combinations of said directions. Furthermore, the paintbrush 4 could be replaced by a roller, spatula, glove, pad, sponge, rag, or the like, the movement of which in successive oblique passes could be referred to the bottom branch 7b of the mat 7 instead of to the top branch 7a.

What is claimed is:

1. An apparatus for demonstrating painting and/or mural-coating techniques, comprising:

a supporting cabinet (1) having a front opening (6), a mat extending inside said cabinet (1) and having a top branch (7a) and a bottom branch (7b) which partially close said front opening (6), a support (5), which projects from said front opening (6) of the cabinet (1) between said top branch (7a) and said bottom branch (7b) of said mat (7) and bears an implement (4) for application; and a motor-driven assembly (15, 22, 30) for displacing said support (5) so as to move said implement (4) for application with respect to said top branch (7a) or bottom branch (7b) of the mat (7), according to passes in alternatingly opposite directions during horizontal alternating strokes and subsequent step-like vertical displacements at the end of each horizontal stroke, simultaneously with said mat (7).

2. The apparatus according to claim 1, wherein said implement (4) for application is selected from a paintbrush, a roller, a spatula, a glove, a pad, a sponge or a rag.

3. The apparatus according to claim 1, wherein said implement (4) for application is carried by said support (5) in a configuration inclined with respect to said top branch (7a) and said bottom branch (7b) of said mat (7).

4. The apparatus according to claim 1, characterized in that said passes in alternatingly opposite directions of said implement (4) for application are oblique.

5. The apparatus according to claim 1, characterized in that said passes in alternatingly opposite directions of said implement (4) for application are horizontal.

6. The apparatus according to claim 1, characterized in that said passes in alternatingly opposite directions of said implement (4) for application are vertical.

7. The apparatus according to claim 1, characterized in that said passes in alternatingly opposite directions of said implement (4) for application are circular.

8. The apparatus according to claim 1, wherein said motor-driven assembly comprises:

a mobile structure (15) carrying a first motor (22) and a first transmission (23, 24, 25) for controlling the alternating displacement of said support (5) of the implement (4) for application, and a crank mechanism (21) and corresponding actuating device (27, 28) for controlling the alternating oblique displacement of said support (5) of the implement (4) for application as a result of its horizontal displacement; and a second motor (30) and a second transmission (29, 31, 32) for controlling stepwise vertical displacement of said mobile structure (15) in synchronization with the alternating horizontal displacement of the latter.

9. The apparatus according to claim 5, wherein said top branch (7a) and said bottom branch (7b) of said mat (7) have respective ends anchored to said cabinet (1), and said mobile structure (15) carries a pair of return elements (10, 12) on which said top branch (7a) and said bottom branch (7b) of said mat (7) are wound.

* * * * *